United States Patent [19]

Kelly

[11] 4,119,863

[45] Oct. 10, 1978

[54] COMBINED HIGH DENSITY SOLAR PANELS AND VERTICAL WIND TURBINES

[76] Inventor: Donald A. Kelly, 58-06 69th Pl., Maspeth, New York, N.Y. 11378

[21] Appl. No.: 604,163

[22] Filed: Aug. 13, 1975

[51] Int. Cl.² .............................................. H02P 9/04
[52] U.S. Cl. .................................................... 290/55
[58] Field of Search ...................... 136/89, 270; 415/2; 126/270, 271; 290/1, 2, 55, 44

[56] References Cited

U.S. PATENT DOCUMENTS

| 679,109 | 7/1901 | Coleman | 415/2 |
|---|---|---|---|
| 3,376,165 | 4/1968 | Abbot | 136/89 |
| 3,419,434 | 12/1968 | Colehower | 136/89 |
| 3,444,946 | 5/1969 | Waterbury | 136/89 |
| 3,934,573 | 1/1976 | Dandini | 126/270 |

Primary Examiner—Robert K. Schaefer
Assistant Examiner—Joan W. Redman

[57] ABSTRACT

The combined high density solar panels and vertical wind turbines consist of multiple solar panels with closely spaced solar cells on both sides which are supported by an open framework and vertical posts.

The adoption of an elevated, rooftop solar panel array, supported by vertical posts makes the basic structure attractive for the inclusion of multiple vertical wind turbines, as a supplementary power source.

This combined natural power conversion arrangement is intended for mounting on the flat roofs of city buildings and other similar flat, limited area sites.

Each solar panel is pivoted within the open framework to follow the sun's excursion relative to the earth, and the solar cells on the panel underside receive the solar energy by way of thin edge reflectors secured to both sides of the solar panels, for a high density exposure configuration.

A washing spray provision is included for the panel array, to keep the panels clean and operation at optimum efficiencies.

10 Claims, 7 Drawing Figures

COMBINED HIGH DENSITY SOLAR PANELS AND VERTICAL WIND TURBINES

BACKGROUND OF THE INVENTION

Various types of solar cell and panel array arrangements have been proposed, built and utilized to date, based on the power generating requirements for the U.S. space vehicles, and more recently as part of several alternate solar energy projects.

Some ground based solar energy systems, such as solar panels generally utilize the silicon crystal cells, which are intended for direct conversion of the sun's energy into electrical power, but at the present time their wide application is not nearly economically practical because of excessively high costs of the precision silicon cells.

Most of the ground based solar cell and panel arrangements that have been proposed make use of large tracts of flat lands, where the solar energy collection panels are generally arranged in an orderly east-west direction in rows and columns to take a maximum advantage of the sun's excursion during each sunlit day relative to the earth's surface.

While this is a straight forward and practical approach for direct solar energy conversion in remote and rural areas, it does not provide for the high density panel concentration required for on-site urban areas, where electrical power is always in demand and present electrical power plants operating at near maximum capacities on high cost hydrocarbon fuels.

This present high density solar panel arrangement is advocated for use in urban areas where space is at a premium, and is intended for mounting on all types of buildings with flat roofs for maximum surface exposure area to the sun's radiant energy.

Although these solar panel arrays are proposed for use with direct conversion silicon solar cells, they are equally adaptable for use with the thermal and photovoltaic types of conversion cells and units, since these must also be exposed normally to the sun's direct rays.

These thermal and other type of solar units would require additional space allocation on both surfaces of the panels, but are generally suitable to this present high density panel configuration.

None of the present solar energy conversion system technology attempts to combine solar energy collectors with wind conversion units, mainly because the conventional geometry of the individual means are not basically compatible.

This present solar panel array configuration, with its elevated flat open framework, supported by vertical posts, lends itself to the inclusion of small capacity vertical wind turbines revolving directly on the vertical support posts of the solar panel array. Since the vertical supports are necessary to elevate the solar panels above the roof level, they become natural elements for the small wind-driven turbine units.

Although these small vertical turbine-type units are not as efficient as comparable windmill units, and cannot produce high power levels as individual units, when the power outputs of approximately six or eight units are combined the total output becomes sizable and worthwhile, as part as an overall natural energy source converter.

This present solar/wind power conversion system does not attempt to deal with, and include the difficult electrical energy storage means, but advocates the immediate use of all the electrical power for either heating or cooling by solid state D.C. units, or for other possible immediate D.C. household electrical applications.

While solar panel arrays located in rural areas require no special cleaning provision, this present system for urban locations will require a water/detergent washing arrangement. These urban solar panel arrays set on roof tops will be exposed to dirt and soot which must be removed periodically to keep the solar cells functioning at optimum power levels.

Conventional windmills are in general more efficient wind energy converters than the proposed hooded wind turbines, but have some shortcomings that these small vertical wind units do not have. The vertical rotating vane units are less prone to damage from high wind loads, and are more easily serviced than comparable windmill units.

Another helpful feature for the vertical wind units is that the electrical producing generator is fully protected from the elements at all times. From an esthetic standpoint these vertical units are less obtrusive and provincial in the public mind.

SUMMARY OF THE INVENTION

The high density solar cell and panel arrays consist of multiple, thin, elongate panels which carry closely spaced square or rectangular solar cells on both sides of each panel surface.

The high density array configuration is intended for mounting on flat roofs of all types of urban buildings, so that all day exposure to solar energy is provided, with the panels following the sun's excursion for approximately ten hours of sunlight, or 150° of angular travel.

The multiple horizontal solar panels have the general appearance of jalousie windows set horizontally, since the panels or slats are of uniform size and shape, and rotate in a generally similar manner to these slatted type of windows or doors.

The main difference in operation for these solar panels is that they can fully rotate past each other without touching, with slight gaps between them, unlike the jalousie units.

Each panel will oscillate over 150°, in an easterly direction in the morning, and uniformly rotate to the opposite direction, westerly direction toward the afternoon, following the sun's full normal rays during ten hours of exposure.

The panels/panel arrays must always be set in line with a true east-west direction so that the solar cells will follow the sun's direct rays at all times. Each panel is connected to the next one by means of linkage which is pivoted to a crank arm on the ends of the panels. The panels must also be pivoted on their exact longitudinal centerlines, so that each panel uniformly clears the next one when rotating.

The end of the horizontal cross-linkage is connected to a crank unit, and in turn, to a timing disc and drive motor unit. This panel oscillating arrangement will provide a fully automatic drive so that the solar panels follow the sun's travel during the day, and slowly return during the night to the startng sun-up position in the morning.

It is possible to design a semi-automatic gravity actuated rotating drive, but this would entail manual resetting at the end of each day, and is therefore less convenient than a fully automatic panel oscillating drive.

The multiple, closely spaced solar cells on the panel undersides receive the sun's energy from flat angled reflectors mounted on both edges of the panels. The sun's rays are transmitted into an edge entrance zone formed by the reflector edge and the panel edge, and reflected onto the underside solar cells.

In this way, some side space is saved, while a fair percentage of solar energy is transmitted to each of the "underside" panel solar cells by reflection. Some losses will occur on the reflector surfaces, but these losses can be minimized by using highly reflective smooth mirror-like surfaces.

The solar panels are pivotally mounted in an open framework which carry the entire panel array assembly. Four or more vertical support posts carry the solar panels and open framework assembly above the roof surface, which may be set at any convenient height above the roof.

A side benefit of this solar panel array and framework assembly is that during the summer, the solar panels provide full area shade for the roof surface, and therefore a cooler roof surface temperature during sunlit days. This shading feature is also attractive when the solar panels are used at ground level for shading walkways, garden shelters, and similar household areas.

During the winter heavy snowfalls the solar panels will be feathered vertically, to avoid excessively heavy loading of the structure, but the structure will be so designed to carry excessive loading, should the feathering function malfunction.

Because these high density solar cell panels are intended for use in cities and large towns where they will be subjected to coatings of dirt and soot, a water and detergent washing spray arrangement must be provided as part of the total energy converting installation.

The washing spray provision will consist of vertical pipes or tubing which are fitted with spray heads at the tops of the pipes approximately two feet above the solar panels, around the perimeter of the open framework. The water supply pipes are uniformly located around the perimeter of the solar panel assembly to provide uniform coverage for washing/cleaning purposes.

A mild detergent may be added to the main water supply at the base of the structure to assure that all the solar panels are thoroughly cleaned, with all foreign material removed from the solar cell surfaces.

Another form of edge reflector arrangement may be utilized in which the long reflective edge surfaces are made in convex form facing the underside solar cells. This convex reflector form would allow a more compact sunray entrance zone, and reduce the total height of the solar panel assembly. This method of sunray divergence would slightly reduce the solar concentration effectiveness, but since the underside solar cells are exposed to reflected sunlight from both edges of the solar panels, the net effect from this convex divergence loss would be minimized. It is now believed that the advantage gained by a more compact solar panel assembly justifies this slight convex ray loss.

There is a further structural advantage to edge reflectors with convex surfaces due to the formed stiffness of such a reflective element which would supplement the longitudinal stiffness of the basic solar panels.

It is important to the space/effectiveness of the system of high density solar panels that the "underside" entrance zone be kept to a minimum area, in order to keep the adjacent, or side-by-side solar panels and their topside solar cells as closely spaced as possible.

Because the basic solar panel and supporting frame assembly lends itself to the inclusion of vertical wind turbines on the vertical axis support posts, a combined solar/wind energy converting system is thereby achieved, for a more balanced power output per exposure day. The likelihood of both day and night power conversion becomes approachable, with this solar/wind energy system, in the urban areas where the supplementary power is needed.

While the classic, non-directional Darrieus vertical types of windmills may be utilized at all the vertical support posts, it is presently believed that the more compact hooded-turbine type of wind unit is naturally suited to, and compatible to the solar panel support post structure.

Since the vertical types of wind turbines are known to be less efficient as wind energy converters, than corresponding conventional windmills, every effort must be made to increase their effectiveness by using ultra-light weight structural elements and coverings, along with precision ball bearings and similar good design practices.

While these vertical wind conversion units are inherently less efficient than their conventional windmill counterparts, they do offer some distinct advantages over the conventional windmills.

As vertical axis turbine type wind energy converters these units are less susceptible to high velocity wind damage, and their driven generators are fully protected from the elements, while being more readily serviced when necessary.

From a purely esthetic standpoint the vertical wind units are less obtrusive in this specific application, and therefore become less provincial in nature, and in the public mind. As part of an urban natural energy conversion system they are more compatible to this combined solar/wind unit arrangement.

From a cost consideration, the vertical wind units are about on a par with conventional equivalent wind mills because the additional cost of the freely rotating wind directional hood is generally offset by the cost of the usual windmill tower, and in many cases may be lower than windmills based on this comparison.

In this specific application the cost projection is slightly more attractive, since the support posts for the wind turbine units are part of a structure with another purpose, ie: supports for the solar panels and open framework, and must be suitably designed for this dual purpose.

The dual purpose support posts must be rigidly secured to the roof surface or other level surface, and must not be subjected to excessive deflections, which would cause binding in the vertical wind turbine bearings. It will be realized from these dual functioning requirements that the solar panels must be as lightweight as possible to keep the total loading on the vertical dual supports to a minimum.

The solar panel open framework structure must have an efficient section modulus and resist the affects of lateral loads, snow loading, and other sudden and unusual loads imposed on the structure.

The total number of vertical supports, and corresponding vertical wind turbines is not limited to any fixed number, and may be customed designed according to the auxiliary power requirements of the specific installation, and cost limitations.

For most practical applications the full solar panel array and vertical posts should never exceed a height of about 8 feet, for rooftop installations, but may possibly be increased for ground level structures, as required.

Because of this height limitation based on structural safety factors and serviceability, the vertical wind turbines for these installations would be limited to about 5 feet in height, and about three to three and one-half feet in diameter.

Approximately two feet must be allowed for the housing of the drive generator at the base of the wind turbine, including drive gears and accessories, and the necessity of clearing rooftop parapets and other rooftop obstructions.

Clearance must also be allowed between the lateral solar panel cranks and horizontal cross linkage, and the vertical wind turbines, which should not exceed about 1 foot in height.

The inclusion of vertical wind turbines is viewed as practical only for rooftop installations, and not for any type of ground level application where people would be exposed to the whirling turbine rotor blades and rotating wind directional hood.

It is a principal object of the invention to create a combined solar/wind energy conversion system which produces the highest possible electrical power-output per unit area utilized, for urban application.

It is a further object of the invention to practically combine both solar and wind energy conversion means into one compatible and cost/effective system.

Other objectives of the invention have been previously defined in the background and summary descriptions of the specifications.

It should be understood that changes and variations may be made in the detail design of the combined high density solar panels and vertical wind turbines, without departing from the spirit and scope of the invention, as specified.

Several Disclosure Documents have been filed with the Office, which previously describe portions of the solar/wind energy conversion system.

Disclosure Documents

No. 042263 — High Density Solar cell and Panel Array

No. 032540 — Wind Rotor on Vertical Axis and Masking Hood

No. 032342 — Wind Rotor — Vertical Axis — Anemometer Type

No. 032255 — Wind Rotor — Vertical Axis with feathering vane

DESCRIPTION OF THE PREFERRED EMBODIMENT

Figure 1:
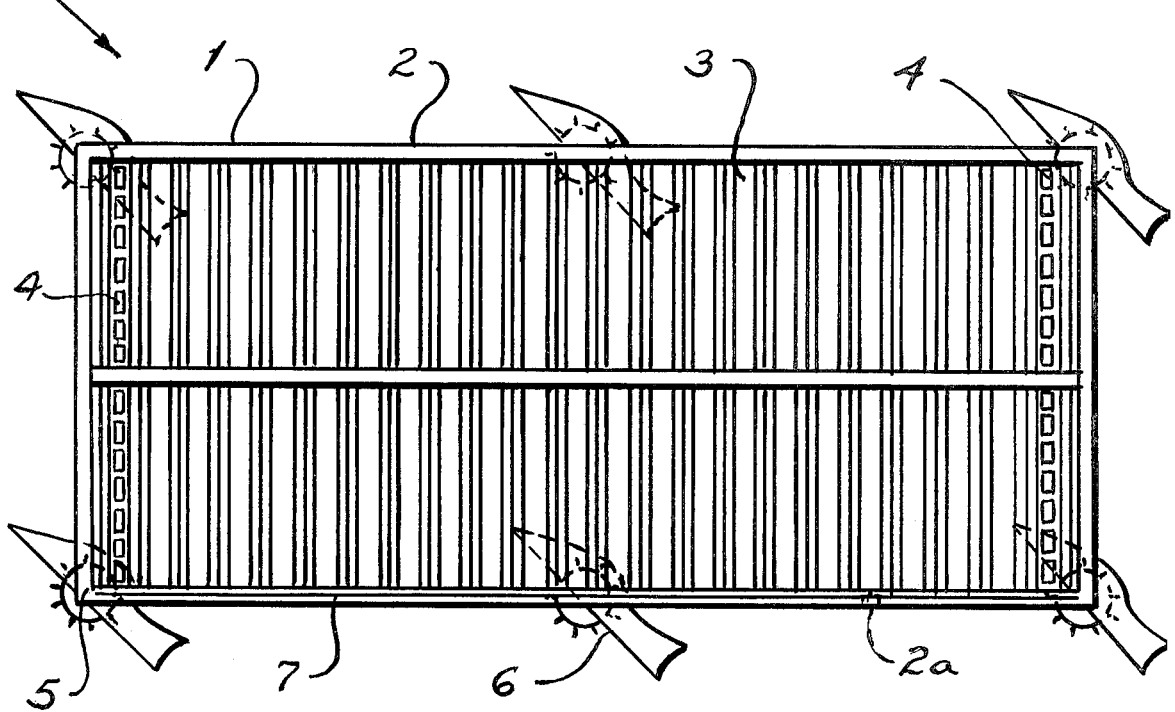
FIG. 1 is a plan view of the combined high density solar panels and vertical wind turbines.
Figure 2:
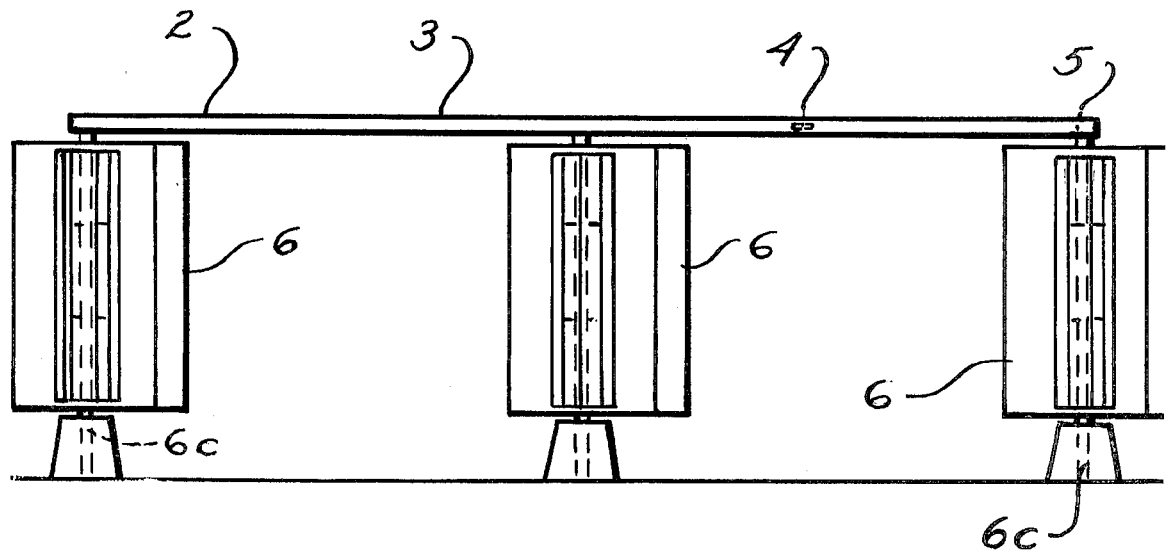
FIG. 2 is a side elevation view of the combined high density solar panel and vertical wind turbines.
Figure 3:
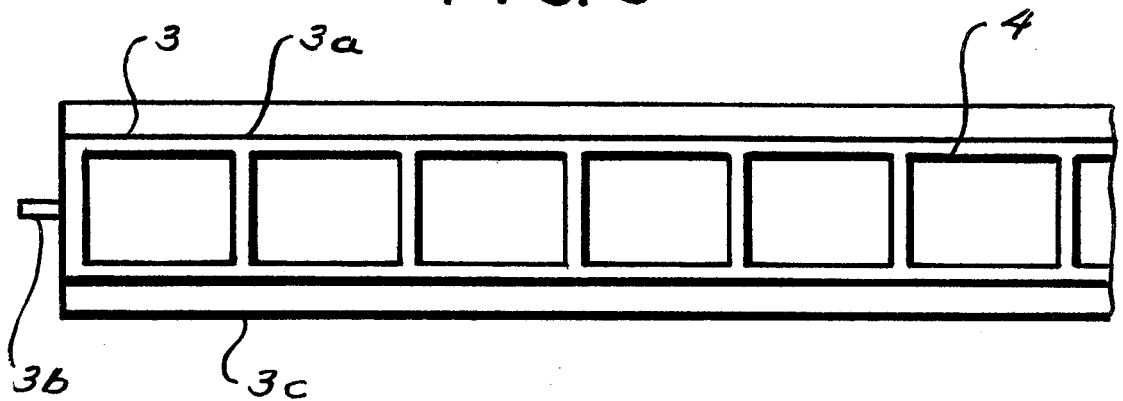
FIG. 3 is a plan view of one typical solar panel.
Figure 4:
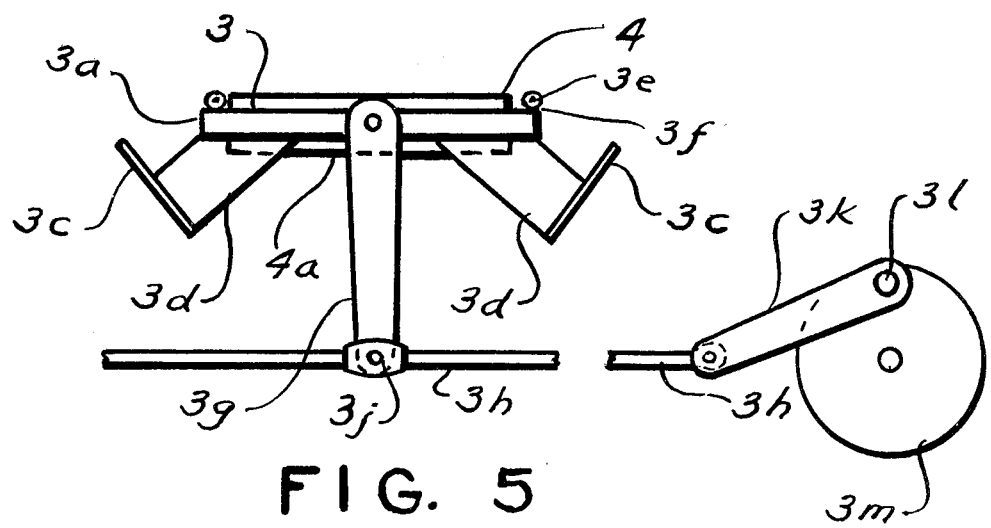
FIG. 4 is an end view of one typical solar panel with multiple solar cells.
Figure 5:
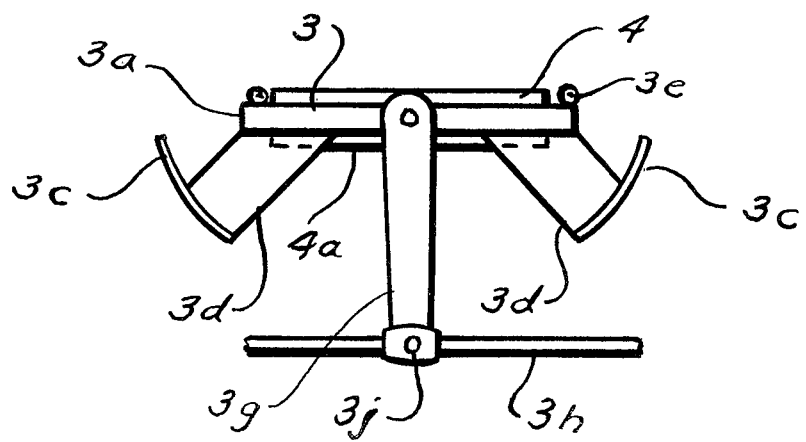
FIG. 5 is an end view of one alternate typical solar panel with multiple solar cells.
Figure 6:
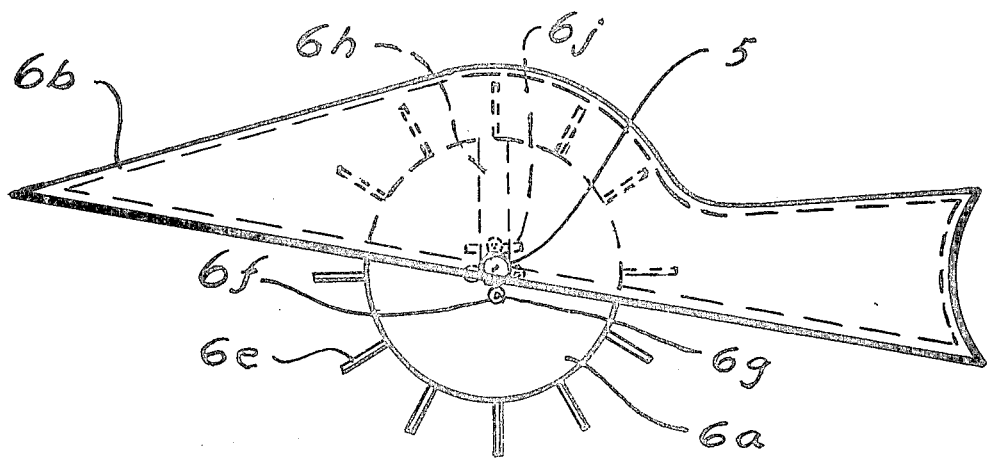
FIG. 6 is a plan view of a typical vertical hooded wind turbine.
Figure 7:
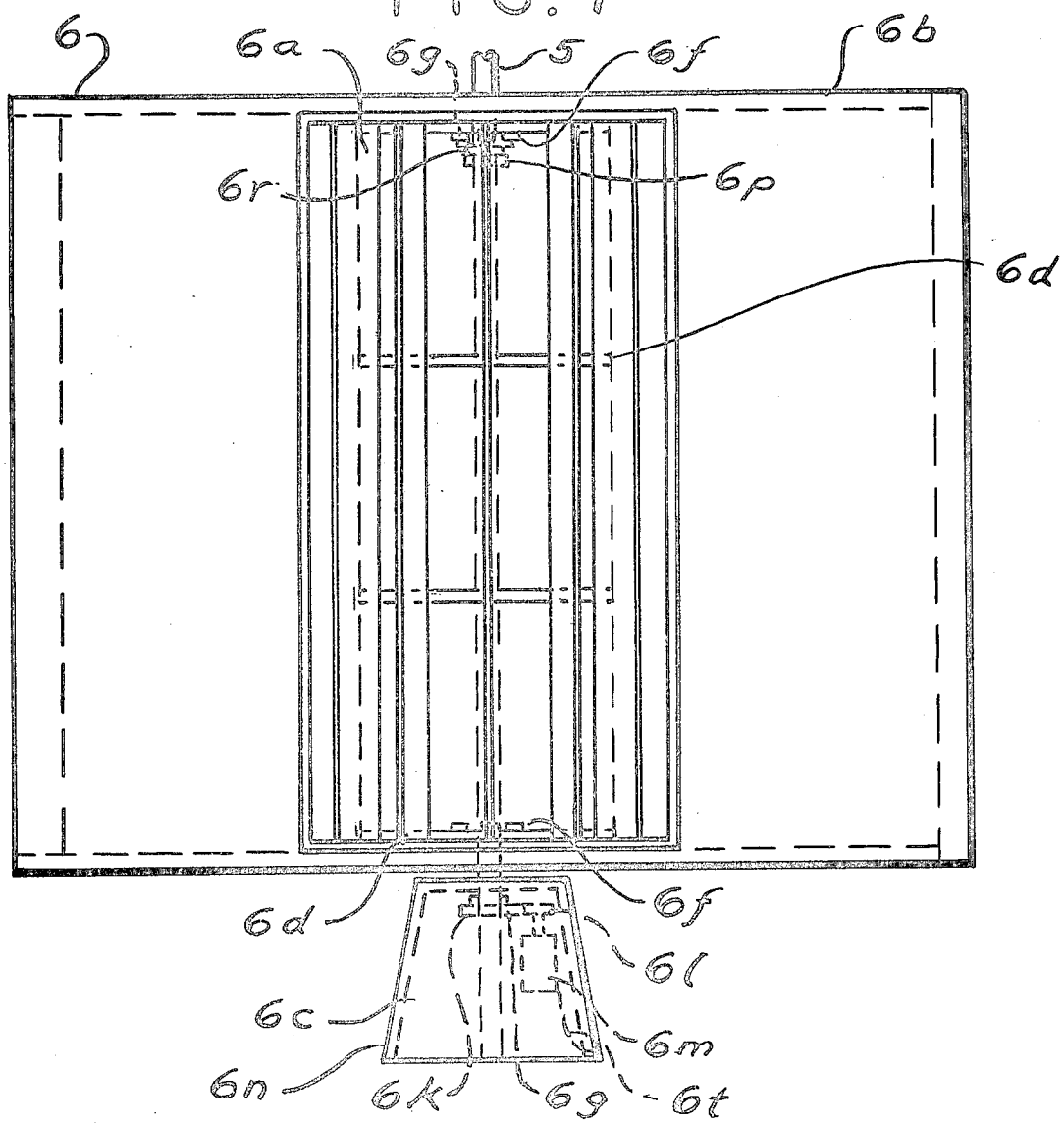
FIG. 7 is an elevation view of a typical vertical hooded wind-turbine.

The combined high density solar panels and vertical wind-turbines consist of the complete assembly installation 1, which is comprised of the following major components: the open framework 2, which support the individual, identical solar panels 3, containing the multiple, uniformly spaced solar cells 4.

The open framework 2, is uniformly supported by the vertical support posts 5, on which the vertical hooded wind turbines 6, freely revolve.

The individual solar panels 3, consist of the lightweight, flat, elongate panels 3a, which are provided with end pivots 3b, on the longitudinal centerline axis of each flat, elongate panel 3a. Each of the solar panels 3, are fitted with two edge reflector strips 3c, which are slightly convexed, toward the panel centerlines.

The edge reflector strips 3c, are secured to the flat, elongate panels 3a, with multiple support fins 3d. The edge reflector strips 3c, are riveted to the multiple support fins 3d, which, in turn, are fastened to the flat, elongate panels 3a, by means of rivets or screws.

The edge-reflector strips 3c, must be set at the correct angle relative to the flat, elongate panels 3, to insure that the sun's reflected rays are uniformly positioned on the panel underside solar cell 4a.

Each of the multiple solar cells 4, is uniformly secured to both sides of the flat, elongate panels 3a, by means of a suitable adhesive, such as epoxy resin or similar adhesive means.

The solar cells 4, are of the grown silicon crystal type, and must be in a square or rectangular form to provide a maximum of surface exposure area on the solar panels 3. The positive and negative electrical leads from the solar cells 4, are connected to the main electrical conductors 3c, along both underside edges of the flat, elongate panels 3a, to form a parallel circuit.

These electrical conductors 3e, are protected from heat and weather exposure by special protective covering 3f, and are formed into wide loops at one end of the solar panels 3, in order to provide for necessary flexing in the conductors, as the solar panels 3, oscillate.

The end pivots 3b, on each of the solar panels 3, are positioned and held in place on the open framework 2, by the multiple small pillow blocks 2a, which are uniformly secured to the open framework 2, with standard mounting hardware.

The end pivots 3b, are fitted with straight cranks 3g, which are locked in place on the end pivots 3b, by conventional fastening means. A horizontal cross link 3h, is pivoted to each crankarm 3g, by means of the crankpin 3j.

One end of the horizontal cross link 3h, is connected to the crank 3k, which is pivoted on the crankpin 3L, on the timing disc 3m. The timing disc 3m, is driven by a D.C. timing motor which makes one full revolution in 24 hours.

The vertical support posts 5, on which the vertical hooded wind turbines 6, revolve, consist of three major components, the vaned rotor 6a, the fairing hood 6b, and the generator housing and drive assembly 6c.

In order to facilitate the assembly and servicing of the vertical wind turbine and components, the vaned rotor 6a, is slotted so that it may be placed on the vertical support posts 5, without these having to be disassembled.

Both the vaned rotor 6a, and fairing hood 6b, are built-up of lightweight rigid framework members and covered with fiberglass, or thin aluminum sheet, to produce a turbine unit which is as lightweight as possible.

The vaned rotor consists of a top and bottom rotor disc, along with two intermediate discs, as four identical rotor discs 6d. The four, or more, discs 6d, are slotted to retain the flat, thin vertical vanes or blades 6e, of the vaned rotor 6a.

Since the vaned rotor 6a, is slotted to facilitate assembly, orbiting ball bearings 6f, must be utilized to allow the rotor to spin freely on the vertical support posts 5.

The orbiting ball bearings 6f, at the top and bottom of the vaned rotor 6a, will be positioned on the rotor discs 6d, by the bearing 6g.

Because the rotor discs 6d, are slotted with the slots 6h, an additional "lock in" ball bearing 6f, and bearing plate 6j, are required to retain the vaned rotor 6a, on the support posts 5.

A flat, possibly split, gear 6k, is located under the lower rotor ball bearings 6f, and is held in place by the bearing pins 6g, which meshes with a pinion 6L, on the electrical generator 6m.

The electrical generator 6m, is securely mounted on a base plate secured to the roof, and a sheet metal housing 6n, covers and protects these components.

A clamp-on collar 6p, is locked onto the vertical support post 5, under the top rotor disc 6d. A ball thrust bearing 6r, is fitted between the underside of the top rotor disc 6d, and the clamp-on collar 6p, to support the revolving weight of the vaned rotor 6a.

The fairing hood 6b, revolves independently from the vaned rotor 6a, on the vertical support post 5, and is free to revolve on its own orbiting bearings 6s.

A clamp-on collar 6p, is locked onto the vertical support post 5, on the underside of the top surface of the fairing hood 6b. A ball thrust bearing 6r, is fitted between the underside of the top surface of the fairing hood 6b, and the clamp-on collar 6p.

The output electrical leads 7, which are connected to the main electrical conductors 3e, from each solar panel 3, will be connected in series with each solar panel 3, to provide a useful amperage output for the system.

The electrical leads 7, will also be connected to the output leads 6t, from the electrical generator 6m, of the vertical wind turbine units 6.

What is claimed is:

1. A combined high density solar cell and panel array with vertical wind turbines comprising multiple identical elongate panels containing multiple square silicon solar cells on both sides of said elongate panels,
    each of said multiple identical elongate panels is pivotally mounted along their longitudinal center axis within a rectangular elevated open frame structure,
    multiple vertical support posts supporting said rectangular elevated open frame structure, each lower end of said multiple vertical support posts is mounted to flat level rooftop surfaces,
    a crank and linkage arrangement secured at one end of each of said multiple identical elongate panels,
    connection means for said crank and linkage arrangement to a crank arm and timing disc,
    connection of said timing disc to a timing motor,
    multiple elongate angled reflectors uniformly disposed on both elongate edges of said multiple identical elongate panels,
    uniformly disposed supporting fins secured to said multiple elongate angled reflectors and to said multiple identical elongate panels,
    multiple vertical spray washing pipes uniformly disposed around the perimeter of said rectangular elevated open frame structure,
    each said multiple vertical spray washing pipe is fitted with a spray head at the top of said spray washing means,
    multiple vertical rotary wind turbines centrally disposed on each of said multiple vertical support posts comprised of vertical identical flat vanes joined together by multiple identical flat slotted discs,
    orbiting bearings uniformly disposed on two of said multiple identical flat slotted discs,
    a clamp-on collar disposed around each of said multiple vertical support posts,
    a thrust ball-bearing axially disposed between said clamp-on collar and one of said multiple identical flat slotted discs,
    a flat gear secured to the lowest of said multiple identical flat slotted discs by means of multiple ball-bearing pins of said orbiting bearings,
    a pinion meshing with said flat gear axially disposed on the shaft of a vertically disposed electrical generator,
    mounting means for said vertically disposed electrical generator on the surface of flat roofs,
    a formed sheet metal housing disposed fully over said flat gear and pinion and said vertically disposed electrical generator,
    a built-up lightweight fairing hoods disposed directly over said multiple vertical rotary wind turbines,
    independent orbiting ball-bearing means for said built-up lightweight fairing hoods disposed at the upper and lower ends,
    a clamp-on collar disposed around each of said multiple vertical support posts,
    a thrust ball-bearing disposed between said clamp-on collar and the upper surface of said built-in lightweight fairing hood.

2. A combined high density solar cell and panel array with vertical wind turbines according to claim 1, in which said multiple identical elongate panels pivot on their longitudinal central axis for a total of seventy-five degrees on either side of a vertical axis,
    said crank arm and timing disc cause one complete oscillation of said multiple identical elongate panels over a period of 24 hours,
    mounting means for said timing disc secured to said timing motor,
    shaft mounting and locking means for said crank and linkage arrangement,
    shaft mounting and locking means for said crankarm and timing disc on said timing motor,
    a low-voltage D.C. power supply means for said timing motor.

3. A combined high density solar cell and panel array with vertical wind turbines according to claim 1, in which said multiple elongate angled reflectors uniformly disposed on both elongate edges of said multiple identical elongate panels are slightly convexed toward the axial centerline of the underside of said multiple identical elongate panels,
    a minimized optimum lateral solar entrance gap and total height for said multiple elongate angled reflectors,
    each of said multiple elongate angled reflectors are comprised of smooth highly polished bright thin sheet metal,
    multiple rivet securing means for joining said multiple elongate angled reflectors to said uniformly disposed supporting fins, multiple machine screw and locking means for joining said uniformly disposed supporting fins to said multiple identical elongate panels.

4. A combined high density solar cell and panel array with vertical wind turbines according to claim 1, in which two additional orbiting bearings are disposed over said slots of the top and bottom said multiple identical flat slotted discs, two mounting plate means for securing said two additional orbiting bearings, bearing pins locating said two mounting plate means for securing said two additional orbiting bearings on the top and bottom of said multiple identical flat slotted plates.

5. A combined high density solar panel array with vertical wind turbines comprising multiple identical flat panels containing multiple electricity producing solar cells on both sides of said multiple identical flat panels, each of said multiple identical flat panels is pivotally mounted along their central axis within a rectangular elevated open framework structure, multiple vertical round support posts supporting said rectangular elevated open framework structure, each lower end of said multiple vertical round support posts is mounted to a flat level roof top surface, bracket securing means for said multiple vertical round support posts, a crank and linkage arrangement secured at one end of each of said multiple identical flat panels, connection means for said crank and linkage arrangement to a crank arm and timing disc, a gravity actuated and escapement control connected to said timing disc, multiple elongate angled flat reflectors uniformly disposed on two edges of said multiple identical flat panels, uniformly disposed supporting fins secured to said multiple elongate angled flat reflectors and to said multiple identical flat panels, multiple vertical rotary wind turbines centrally disposed on each of said multiple vertical round support posts comprised vertical identical flat vanes joined together by multiple identical flat slotted discs, multiple orbiting bearings uniformly disposed on two of said multiple identical flat slotted discs, a clamp-on collar disposed around each of said multiple vertical round support posts, a thrust ball-bearing axially disposed between said clamp-on collar and one of said multiple flat slotted discs, a flat split gear secured to the lowest of said multiple identical flat slotted discs by means of multiple ball bearing pins of said multiple orbiting bearings, a pinion meshing with said flat split gear axially disposed on the shaft of a vertically disposed electrical alternator on the surface of flat roofs, mounting means for said vertically disposed electrical alternator on the surface of flat roofs, a formed sheet metal housing disposed fully over said flat split gear and pinion and said vertically disposed electrical alternator, built-up lightweight fairing hoods disposed directly over said multiple vertical rotary wind turbines, independent multiple orbiting ball-bearings for said built-up lightweight fairing hoods disposed at the upper and lower surfaces, a clamp-on disposed around each of said multiple vertical round support posts, a thrust ball-bearing disposed between said clamp-on collar and the inside upper surface of said built-up lightweight fairing hoods.

6. A combined high density solar cell and panel array with vertical wind turbines according to claim 5, wherein said multiple identical flat panels pivot a total of one hundred and fifty degrees during one full ten hour time period, said crank arm and timing disc cause one complete oscillation of said multiple identical flat panels in a twenty-four hour period, mounting means for said crank arm and timing disc on flat rooftops, shaft mounting and locking means for said crank and linkage arrangement and said crank arm and timing disc.

7. A combined high density solar cell and panel array with vertical wind turbines according to claim 5, in which said multiple elongate angled flat reflectors uniformly disposed on two edges of said multiple identical flat panels are made into convex form facing toward the axial centerline of the underside of said multiple identical flat panels, said multiple elongate angled flat reflectors made into convex form are comprised of smooth highly polished bright sheet aluminum, multiple rivet securing means for joining said multiple elongate angled flat reflectors to said uniformly disposed supporting fins, multiple machine screw and locking means for joining said uniformly disposed supporting fins to said multiple identical flat panels.

8. A combined high density solar cell and panel array with vertical turbines according to claim 5, including the electrical connection of each of said multiple electricity producing solar cells on each of said multiple identical flat panels in parallel circuits for voltage addition, the electrical connection of each of said multiple identical flat panels in a series circuit for amperage addition, the connection of the electrical connections from each of said electrical alternators in a series circuit for amperage addition.

9. A combined high density solar cell and panel array with vertical wind turbines according to claim 5, in which said natural energy conversion arrangement is utilized on the flat rooftops of urban buildings of all types, the total electrical power output of the solar/wind power system is immediately utilized for electrical heating and cooling and other building electrical needs without any electrical stoppage means of any kind.

10. A combined high density solar cell and panel array with vertical turbines according to claim 5, in which said natural energy conversion arrangement is set in an optimum easterly-westerly direction relative to the oscillation of said multiple identical flat panels, said multiple identical flat panels provide a shading means for the flat rooftops of urban buildings of all types from solar heat, said rectangular elevated open framework structure and said multiple vertical round support posts have sufficient strength to withstand unexpected loading due to elemental forces.

* * * * *